United States Patent Office 3,728,276
Patented Apr. 17, 1973

3,728,276
PRESSURIZED FOAM-PRODUCING COMPOSITION
AND PROCESS THEREFOR
George Lieberman, 13537 Mineola St., Pacoima, Calif. 91332; and Victor J. Pierce, 2040 Vestal 90026; and Samuel B. Prussin, 2126 Banyan Drive 90049, both of Los Angeles, Calif.
No Drawing. Continuation of application Ser. No. 601,837, Dec. 15, 1966, which is a continuation-in-part of application Ser. No. 519,445, Jan. 10, 1966. This application Feb. 20, 1970, Ser. No. 14,714
Int. Cl. A61k 7/00; A611 9/04; C09k 3/30
U.S. Cl. 252—305
10 Claims

ABSTRACT OF THE DISCLOSURE

A pressurized foam-producing composition comprising 75 to 95 percent by weight of a chlorofluorocarbon propellent system having a vapor pressure of 10 to 30 pounds per square inch gauge at 70° F. emulsified as the dispersed phase in an aqueous continuous phase in the presence of an emulsifier in an amount sufficient to yield a stable emulsion, the composition upon the release of pressure forming a foam which exhibits a crackling sound when subjected to shear.

---

This application is a continuation of application Ser. No. 601,837 filed Dec. 15, 1966, now abandoned, which was a continuation-in-part of application Ser. No. 519,445 filed Jan. 10, 1966, now also abandoned.

This invention relates to compositions of matter classified in the art as pressurized compositions which upon release of pressure therefrom form a foam and to a process of preparing the same.

The invention sought to be patented in its product composition aspect is described as residing in the concept of a composition comprising 75 to 95% by weight of a chlorofluorocarbon propellent system having a vapor pressure of 10 to 30 pounds per square inch gauge at 70° emulsified as the dispersed phase in an aqueous continuous phase in the presence of an emulsifier in an amount sufficient to yield a stable emulsion, the composition upon the release of pressure forming a foam which exhibits a crackling sound when subjected to shear.

The invention sought to be patented in its process aspect is described as residing in the concept of a process for preparing a pressurized composition which upon release of pressure forms a foam which exhibits a crackling sound when subjected to shear and comprising 75 to 95% by weight of a chlorofluorocarbon propellent system having a vapor pressure of 10 to 30 pounds per square inch gauge at 70° F. emulsified as the dispersed phase in an aqueous continuous phase in the presence of a water-dispersible emulsifier in an amount sufficient to yield a stable emulsion, said process comprising the steps of forming a dispersion of said emulsifier in water, chilling said dispersion to a temperature between the freezing point of the dispersion and the boiling point of the propellant to be used, adding to said dispersion 15 to 25% of the total weight of said propellant chilled to a temperature of between the freezing point of the dispersion and the boiling point of the propellant, stirring the resulting mixture until an emulsion is formed and adding the remainder of the propellant at a temperature between the freezing point of the dispersion and the boiling point of the propellant.

Pressurized compositions capable upon release of pressure to form a foam are well known in the art of compounding aerosol compositions. The present invention resides in a composition formulated in such a way as to exhibit the unique property of causing a crackling sound when the foam is subject to shear. Compositions prepared in accordance with the invention may be formulated with cosmetically active ingredients to provide compositions having a wide range of cosmetic purposes. The crackling sound which imparts a high degree of sales appeal to the product is produced when the user subjects the foam to shear upon rubbing it over his skin with his hand.

The manner and process of making and using the invention will now be generally described so as to enable one skilled in the art of cosmetic chemistry to make and use the same as follows:

The compositions of this invention are in the form of a pressurized emulsion of the oil-in-water type with an aqueous continuous phase and a dispersed or oil phase constituting propellant and propellant-soluble materials in the composition. It is of critical importance that 75 to 95 percent by weight of the composition constitute a chlorofluorocarbon-based propellent system. It is a unique condition of the compositions of this invention that the major component in the system (propellent) constitutes the dispersed rather than the continuous phase of the emulsion.

The propellent system used in compositions of this invention is based upon low-boiling chlorofluorocarbons as the pressure generating components. Chlorofluorocarbons are well known in the aerosol-compounding art and any such compound or mixtures thereof can be employed, provided that the propellent system has a vapor pressure of 10 to 30 pounds per square inch gauge at 70° F. A vapor pressure below 10 pounds per square inch gauge is too low for effective dispensing of the composition whereas a vapor pressure above 30 pounds per square inch gauge results in a composition which does not exhibit a crackling sound when subjected to shear. The propellent system can also contain propellent-soluble materials such as methylene chloride for aid in adjusting vapor pressure to within the desired and critical range. It has been found that 1,2-dichloro-1,1,2,2-tetrafluoroethane is a particularly effective propellant in the preparation of compositions in accordance with the invention either alone or in admixture with dichlorodifluoromethane in an amount of not more than 25% by weight of the propellent system.

The composition must also contain a water-dispersible emulsifier in an amount sufficient to yield a stable emulsion of the oil-in-water type with the phase ratios as above specified. Any of the well known emulsifiers which have been used in the art to prepare oil-in-water emulsions may be used. Among the classes of emulsifiers which have been found to be suitable in the formulation of compositions in accordance with the invention are lower alkyl ethers of polyethylene, polypropylene or mixed polyethylene-polypropylene glycols, for example, the monobutoxy ether of mixed polyethylene-polypropylene glycols, having a molecular weight of about 2500; mixed ammonium-higher alkyl sulfates, for example, ammonium palmityl sulfate, ammonium lauryl sulfate and the like; polyethylene and polypropylene glycol ethers of higher alkyl alcohols, for example, the polyethylene glycol ether of lauryl alcohol; alkyl benzene sulfonates such as lauryl benzene sulfonate; amides of higher alkyl alcohols such as the triethanolamide of lauryl alcohol; and imidazoline amphoteric compounds of the formula:

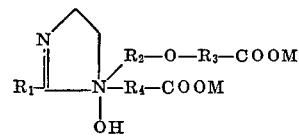

wherein $R_1$ is an alkyl radical of 4 to 18 carbon atoms, $R_2$, $R_3$ and $R_4$ are alkylene radicals of 1 to 4 carbon atoms and M is an alkali metal, as described in U.S. Patent 2,773,068, for example the disodium salt of lauroyl-cycloimidinium-1-ethoxy-ethionic acid-2-ethionic acid (N is sodium, $R_1$ is $C_{11}H_{23}$, $R_2$ is $C_2H_4$ and $R_3$ and $R_4$ are $CH_2$).

As used herein, the terms "lower alkyl" and "higher alkyl" mean alkyl radicals of 1 to 6 and 10 to 40 carbon atoms, respectively. The lower alkyl ethers of polyethylene, polypropylene or mixed polyethylene-polypropylene glycols are a particularly effective class of emulsifiers in the preparation of compositions of this invention.

The amount of emulsifier should be the minimum amount required to yield a stable emulsion system, that is one which after formation will not separate upon standing. It has been found that an amount of emulsifier of 0.1% to 2% by weight of the composition results in the preparation of stable emulsions in accordance with the invention which upon release of pressure yields foams which exhibit a pronounced crackling sound when subjected to shear.

The compositions of the invention are useful for a wide range of end use applications in the field of cosmetics, for example, as after- and pre-shave lotions, as perfumes and colognes, astringents, deodorants and antiperspirants, antiseptics and in the formulation of various treatment and cleansing compositions. The desired active ingredients or mixtures of ingredients are present in an amount sufficient to give the desired cosmetic effect, the ingredients being split between the aqueous and dispersed phases of the emulsion based upon their solubility properties.

The compositions of this invention are most desirably prepared in accordance with the process aspect of this invention by the following sequence of steps. An initial aqueous dispersion of the comestically active ingredients, emulsifier and water in the amounts which will be present in the final composition is prepared and such initial dispersion is chilled to a temperature between its freezing point and the boiling point of the propellent system to be used in the composition. The freezing point of the initial aqueous dispersion will range from about 28° F. to 32° F. depending upon the quantity and nature of the cosmetically active ingredients used. The upper temperature limit, the boiling point of the propellent system to be used in the composition, will range up to 38° F. When the preferred 1,2-dichloro-1,1,2,2-tetrafluoroethane is used as propellant either alone or in admixture with up to about 10% by weight of dichlorodifluoromethane, the atmospheric pressure boiling point of such propellent system is such the process can be carried at atmospheric pressure. This is particular desirable. When the propellent system contains from about 10 up to about 25% by weight of dichlorodifluoromethane, the process is carried out under the vapor pressure of the propellant at a maximum temperature of 38° F. To the chilled initial dispersion is then added 15 to 25% of the total weight of the propellent system to be used which has been prechilled to a temperature between the freezing point of the initial dispersion and the boiling point of the propellant and the resulting mixture is stirred until a uniform emulsion is formed. The balance of the propellent system chilled to a temperature between the freezing point of the initial dispersion and the boiling point of the propellent system is then added with stirring to the mixture. This preferred method of preparing the compositions of this invention in accordance with its process aspect is particularly desirable in that such compositions are prepared in a minimum amount of time which results in the preparation of compositions which have an unusually high degree of stability.

Alternately, it is possible to prepare the compositions of this invention in accordance with various well-known techniques in the art of emulsion and aerosol compounding technology.

In accordance with one alternate formulation technique, the desired amount of emulsifier is blended with an aqueous concentrate of the desired cosmetically active ingredients and the mixture is heated to a temperature and for a time sufficient to insure dispersion of the emulsifier in the aqueous system to result in formation of an initial emulsion in water of the water-insoluble oils present in the cosmetically active ingredients. The requisit amount of this emulsion is placed in the commercial packages, a valve is crimped in place on each package and the propellent system is then pressurized into the composition. The resulting mixture at this stage is in three discrete phases constituting a water phase, an emulsified oil phase comprising the oils in the cosmetically active ingredients and a phase representing the propellent system. This mixture is then shaken until a final emulsion forms in which the propellent system becomes emulsified in the water phase.

In accordance with a second alternate formulation technique, an initial emulsion of the oils present in the cosmetically active ingredients in water is prepared as described above and filled into commercial packages. The containers are cooled, the propellent system at a temperature below its atmospheric boiling point is introduced, a valve is crimped in place and the packages are shaken in the cold until the final emulsion forms.

In accordance with a third alternate technique, all ingredients are placed in a large vessel under pressure at room temperature and the mixture is subjected to vigorous agitation until the final emulsion is formed. This reservoir of emulsion is then used in a cold or pressure-filling operation in which the desired amount of emulsion is introduced into each commercial package and a valve is crimped in place on each package.

The best mode contemplated by the inventors for carrying out their invention is now set forth as follows:

EXAMPLE 1

A men's after-shave lotion is formulated to contain:

| | Percent by weight |
|---|---|
| Diisopropyl adipate | 0.778 |
| Perfume | 1.090 |
| Menthol | 0.060 |
| Tergitol-XD [1] | 0.500 |
| Water | 9.572 |
| Propellant 114 [2] | 88.000 |
| | 100.000 |

[1] Monobutoxy ether of polyethylene-polypropylene glycols, molecular weight of about 2500, Union Carbide Chemicals, New York, N.Y.
[2] 1,2-dichloro-1,1,2,2-tetrafluoroethane.

In formulation, the first three ingredients are blended and the resulting blend is stirred in the water with the Tergitol-XD emulsifier to form a primary emulsion. This emulsion is cooled to a temperature of 33° F. and 17.6 parts by weight of Propellant 114 prechilled to 33° F. are added. The resulting mixture is stirred until a uniform emulsion is formed and the balance of the propellant (70.4 parts by weight) is added while the mixture is continuously stirred. The resulting mixture in the form of an emulsion in which the Propellant 114 is the dispersed phase is filled in bottles which have been prechilled to 33° F. and a conventional dispensing valve is crimped in place.

In use as an after-shave lotion, the emulsion is released from the container upon the user's hand in the form of a foam. The foam is rubbed into the user's face after shaving which results in a crackling sound as the foam is subjected to shear.

The following example illustrates the preparation of the formulation of Example 1 by an alternate method.

EXAMPLE 2

In formulation, the first three ingredients are blended and the resulting blend is stirred in the water with the Tergitol-XD emulsifier to form a primary emulsion concentrate. 12 parts of concentrate is placed in an aerosol container and the valve crimped in place. Propellant 114 (88 parts) is pressurized into the container which is then shaken until a homogeneous stable emulsion forms.

The following examples illustrate the preparation of other compositions of the invention, which are formulated and packaged as described in Example 2.

EXAMPLE 3

Women's cologne

| | Percent by weight |
|---|---|
| Diisopropyl adipate | 0.750 |
| Perfume | 1.000 |
| Tergitol-XD | 0.300 |
| Stepan P-616 [1] | 0.250 |
| Water | 9.700 |
| Propellant 114 | 88.000 |
| | 100.000 |

[1] Triethanolamide of lauryl alcohol, Stepan Chemical Company, Northfield, Ill.

EXAMPLE 4

Men's pre-shave

| | Percent by weight |
|---|---|
| Isopropyl myristate | 6.00 |
| Perfume | 0.30 |
| Tergitol-XD | 0.30 |
| Water | 5.00 |
| Propellant 114 | 88.40 |
| | 100.00 |

EXAMPLE 5

A deep cleansing cream

| | Percent by weight |
|---|---|
| Diisopropyl adipate | 7.0 |
| Perfume | 0.3 |
| Hexadecyl alcohol | 2.0 |
| Ammonium lauryl sulfate | 1.0 |
| Water | 10.5 |
| Propellant 114 | 79.2 |
| | 100.0 |

EXAMPLE 6

Astringent

| | Percent by weight |
|---|---|
| Diisopropyl adipate | 0.75 |
| Perfume | 1.00 |
| Zinc sulfocarbolate | 0.30 |
| Tergitol-XD | 0.40 |
| Water | 9.55 |
| Propellant 114 | 88.00 |
| | 100.00 |

EXAMPLE 7

Cologne

| | Percent by weight |
|---|---|
| Diisopropyl adipate | 0.756 |
| Perfume | 1.068 |
| Stepan P-616 | 1.000 |
| Water | 9.176 |
| Propellant 114 | 88.000 |
| | 100.000 |

EXAMPLE 8

Cologne

| | Percent by weight |
|---|---|
| Diisopropyl adipate | 0.756 |
| Perfume | 1.068 |
| Ultrawet 60-L [1] | 0.333 |
| Water | 9.843 |
| Propellant 114 | 80.000 |
| Propellant 12 [2] | 8.000 |
| | 100.000 |

[1] Alkyl benzene sulfonate, sodium salt, the alkyl portion having an average chain length of 11.3 carbon atoms, primarily lauryl, Atlantic Refining Corp., Philadelphia, Pa.
[2] Dichlorodifluoromethane.

EXAMPLE 9

Cologne

| | Percent by weight |
|---|---|
| Diisopropyl adipate | 0.756 |
| Perfume | 1.068 |
| Promulgen D [1] | 1.000 |
| Water | 17.176 |
| Propellant 114 | 80.000 |
| | 100.000 |

[1] Polyethylene glycol ether of high molecular weight fatty alcohol, Robinson-Wagner, Mamaroneck, N.Y.

EXAMPLE 10

Cologne

| | Percent by weight |
|---|---|
| Diisopropyl adipate | 1.00 |
| Perfume | 1.00 |
| Miranol C2M [1] | 1.05 |
| Water | 8.00 |
| Propellant 114 | 88.95 |
| | 100.00 |

[1] Disodium salt of lauroylcycloimidinium-1-ethoxyethionic acid-2-ethionic acid, Miranol Chemical Co., Inc., Irvington, N.J.

The compositions of Examples 3 to 10 all exhibit a pronounced crackling sound when subjected to shear after application to the skin.

The subject matter which the inventors regard as their invention is particularly pointed out and distinctly claimed as follows.

We claim:

1. A method of preparing a pressurized composition which upon release of pressure forms a foam which exhibits a crackling sound when subjected to shear and comprising 75 to 95% by weight of a chlorofluorocarbon propellant system having a vapor pressure of 10 to 30 pounds per square inch gauge at 70° F. emulsified as the dispersed phase in an aqueous continuous phase in the presence of a water-dispersible emulsifier in an amount sufficient to yield a stable emulsion, said method comprising the steps of forming a dispersion of said emulsifier in water, chilling said dispersion to a temperature of between its freezing point and the boiling point of the propellant, adding to said dispersion 15 to 25% of the total weight of the propellant chilled to a temperature of between the freezing point of said dispersion and the boiling point of the propellant, stirring the resulting mixture until an emulsion is formed and adding the remainder of the propellant at a temperature between the freezing point of said dispersion and the boiling point of the propellant.

2. A pressurized composition which upon release of pressure forms a foam which exhibits a crackling sound when subjected to shear comprising 75 to 95% by weight of a chlorofluorocarbon propellant system having a vapor pressure of 10 to 30 pounds per square inch gauge at 70° F. emulsified as the dispersed phase in an aqueous continuous phase in the presence of a water-dispersible emulsifier in an amount sufficient to yield a stable emulsion.

3. A composition according to claim 2 wherein said propellant system consists of a member selected from the group consisting of 1,2-dichloro-1,1,2,2-tetrafluoroethane and mixtures of 1,2-dichloro-1,1,2,2-tetrafluoroethane and dichlorodifluoromethane containing not more than 25 percent by weight of dichlorodifluoromethane.

4. A composition according to claim 2 in which said emulsifier is present in an amount of 0.1 to 2 percent by weight of the composition.

5. A composition according to claim 2 wherein said emulsifier is a lower alkyl ether of a glycol selected from the group consisting of polyethylene glycol, polypropylene glycol and mixtures thereof.

6. A composition according to claim 2 wherein said emulsifier is a mixed ammonium higher alkyl sulfate.

7. A composition according to claim 2 wherein said emulsified is a poly-lower alkylene glycol ether of a higher alkyl alcohol.

8. A composition according to claim 2 wherein said emulsifier is a higher alkyl benzene sulfonate.

9. A composition according to claim 2 wherein said emulsifier is a triethanolamide of a higher alkyl alcohol.

10. A composition according to claim 2 wherein said emulsifier is a compound of the formula

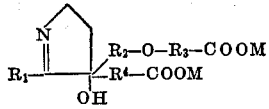

wherein $R_1$ is an alkyl radical of 4 to 18 carbon atoms, $R_2$, $R_3$ and $R_4$ are alkylene radicals of 1 to 4 carbon atoms and M is an alkali metal.

References Cited

UNITED STATES PATENTS

| | | | |
|---|---|---|---|
| 2,655,480 | 10/1953 | Spitzer et al. | 252—305 X |
| 2,719,129 | 9/1955 | Richardson | 424—45 |
| 3,103,468 | 9/1963 | Shepard et al. | 252—305 X |
| 3,131,153 | 4/1964 | Klausner | 252—90 X |
| 2,908,650 | 10/1959 | Fine | 252—305 X |
| 3,282,776 | 11/1966 | Kitzke et al. | 252—90 X |
| 2,726,027 | 12/1955 | North, Jr., et al. | 53—25 X |

RICHARD D. LOVERING, Primary Examiner

U.S. Cl. X.R.

53—22 R; 252—90; 424—45, 47